United States Patent [19]

Smith

[11] Patent Number: 5,011,462

[45] Date of Patent: Apr. 30, 1991

[54] CONNECTOR FOR CONNECTIBLE BELT AND METHOD FOR USING SAME

[75] Inventor: Thomas R. Smith, Newton, Iowa

[73] Assignee: Pyramid, Inc., Newton, Iowa

[21] Appl. No.: 529,946

[22] Filed: May 29, 1990

[51] Int. Cl.[5] .............................................. F16G 15/00
[52] U.S. Cl. ..................................... 474/255; 24/573.3
[58] Field of Search ........................ 474/253, 255–257; 24/31 R, 33 C, 34, 33 M, 39, 698.3, 116 R, 230.5 AD

[56] References Cited

U.S. PATENT DOCUMENTS

| 28,033 | 4/1860 | Blake | 474/255 X |
|---|---|---|---|
| 244,995 | 8/1881 | Jarolimek | 474/255 X |
| 383,208 | 5/1888 | Binns | 474/255 |
| 2,109,717 | 3/1938 | Arnold | 474/255 |
| 3,631,733 | 1/1972 | Thompson, Jr. | 474/255 |
| 3,820,195 | 6/1974 | Hutzell | 17/44.2 |
| 3,841,168 | 10/1974 | Daniels | 474/255 X |
| 4,135,693 | 1/1979 | Miavitz | 248/339 |
| 4,363,509 | 12/1982 | Schreyer | 24/698 |
| 4,392,281 | 7/1983 | Metz et al. | 24/698 |
| 4,404,712 | 9/1983 | Northe et al. | 24/129 |
| 4,650,446 | 3/1987 | Pinto et al. | 474/253 |
| 4,681,646 | 7/1987 | Pinto et al. | 474/256 |
| 4,781,666 | 11/1988 | Acee, Sr. | 474/253 |
| 4,795,410 | 1/1989 | Alderfer | 474/256 |
| 4,929,222 | 5/1990 | Smith et al. | 474/255 |

FOREIGN PATENT DOCUMENTS 0506868  12/1954  Italy .................................. 474/255

Primary Examiner—Thuy M. Bui
Attorney, Agent, or Firm—Zarley, McKee, Thomte, Voorhees & Sease

[57] ABSTRACT

The belt connector of the present invention comprises an elongated shank having two J-hooks at its opposite ends. Each J-hook is performed to make an elongated slot which is approximately one half the width of the diameter of the loop member which forms the loops at the ends of the connectible belt. When the loops are forced into the slots of the J-hooks of the connector, they are compressed to form an oval shape which resists movement or turning within the slot.

7 Claims, 2 Drawing Sheets

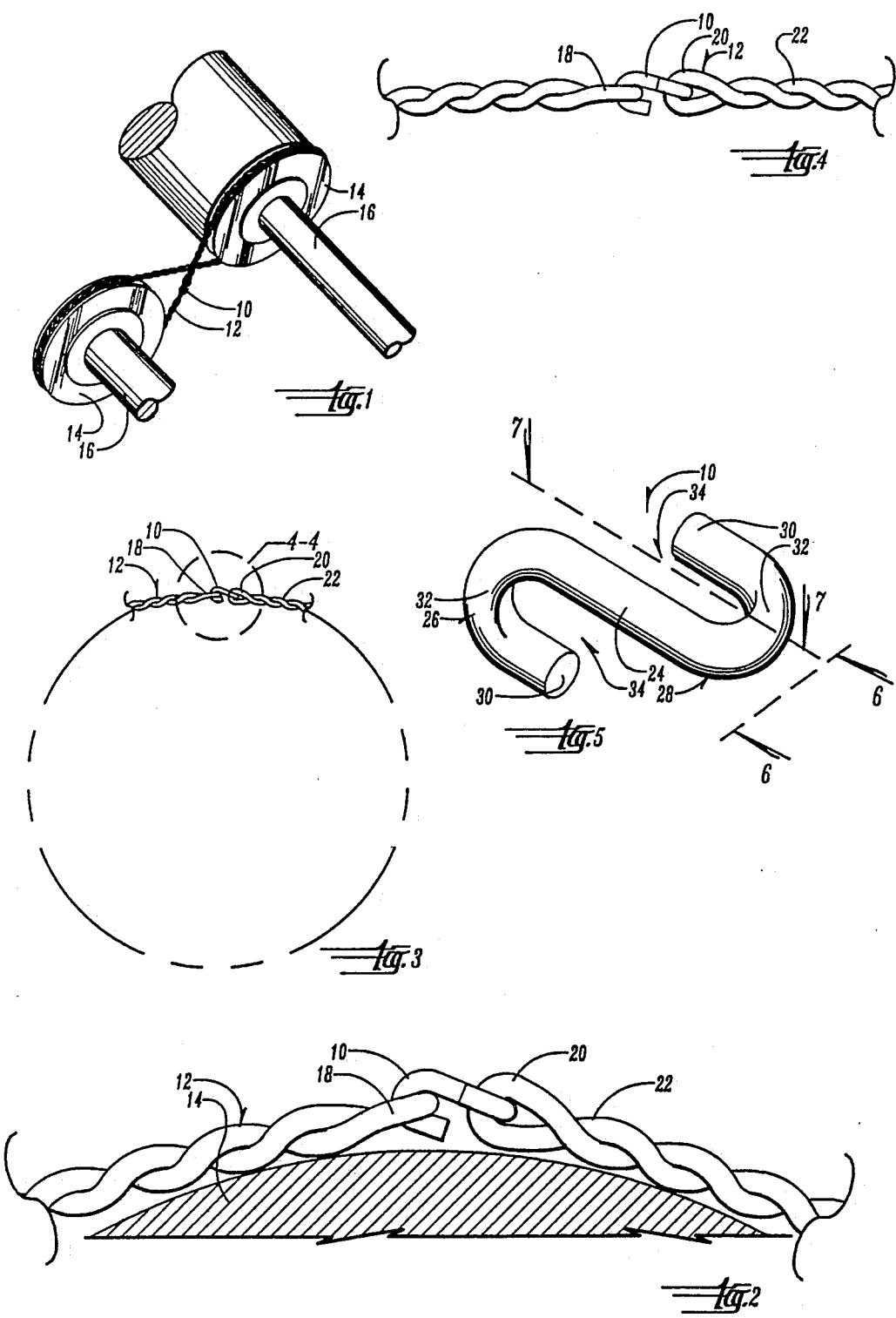

CONNECTOR FOR CONNECTIBLE BELT AND METHOD FOR USING SAME

BACKGROUND OF THE INVENTION

The present invention relates to a connector for a connectible belt and a method for using the same.

Connectible belts have been utilized in many applications where it is not possible to form a continuous belt before applying the belt to the particular pulleys upon which it is mounted. In these situations, an elongated belt member is trained around the pulleys and then the opposite ends of the belt member are connected together by a connector. In many applications the connectible belts are made of an elastomeric material such as polyurethane and are provided with loops at each end which can be fastened to the connector.

One type of connector used in the past included an elongated metal clip having two J-shaped hooks at its opposite ends. The J-shaped hooks are hooked through the loops at the ends of the belt to connect them together.

In prior devices, the size of the J-hooks at the opposite ends of the connector are larger than the diameters of the loops to which they are connected. As a result, pivotal movement is permitted between the loop ends of the belt and the J-hooks of the connector. The disadvantage of this type of connector is that the relative movement between the connector and the loop of the belt causes excessive wear as the belt moves around the pulleys.

One manner of eliminating this problem in the past has been to bend or crimp the connectors tightly upon the elastomeric loops so as to prevent their movement between the connector clip and the loop of the belt. The disadvantage of this feature is that in assembling the belt a tool must be used to crimp the connector, and after being crimped the belt cannot be disassembled.

Therefore, a primary object of the present invention is the provision of an improved connector for a connectible belt and method for using same.

A further object of the present invention is the provision of an improved connector which prevents relative rotational movement between the belt loop and the connector as the belt moves around a pair of pulleys.

A further object of the present invention is the provision of an improved connector which does not require the use of a crimping tool or other type of tool to prevent relative movement the belt loops and the connector.

A further object of the present invention is the provision of an improved connector which can be disconnected from the belt without the need for using special tools.

A further object of the present invention is the provision of an improved connector which can be placed in a container with other connectors and which will not become entangled or hooked upon other connectors within the container.

A further object of the present invention is the provision of a method and means which is an economical to practice, efficient in operation, and durable in use.

SUMMARY OF THE INVENTION

The present invention utilizes a connector having two J-shaped hooks at opposite ends thereof which are interconnected by an elongated shank. The hooks each form an elongated slot which is adapted to receive one of the loop ends of the belt. The width of the slot is substantially less than the diameter of the loops so that when the loops are inserted within the slot they are compressed into an elongated cross sectional shape. If the normal shape of the loop is round in cross section, it is compressed into an elliptical shape when it is compressed within the J-slots of the hook connectors. Preferably the width of the slot is approximately one half of the diameter of the loop members forming the loops in the belt. When the loop is compressed within the J-slot, the elongated or elliptical shape of the loop member prevents it from rotating or moving within the J-slot. There is no need to crimp or bend the J-hooks of the connector, since the elliptical compressed shape of the loop member prevents relative rotation between the loop member and the hook. When it is desired to remove the hook from the loop, all that is necessary is to slide the loop member out of the slot. This can be done easily since the J-hook has not been crimped as in prior devices.

Another advantageous feature of the present invention is the fact that the mouths of the slots formed by the J-hooks are narrower than the diameter of the connectors themselves. This permits the connectors to be placed within a container with a plurality of other connectors. The container can be used to tumble the connectors during manufacture so that all burrs and rough edges are removed from the connectors. Since the openings of the slots are less than the diameters of the connectors, there is no tangling or hooking of the connectors relative to one another during the tumbling action.

BRIEF DESCRIPTION OF THE FIGURES OF THE DRAWINGS

FIG. 1 is a perspective view illustrating a belt using the connector of the present invention.

FIG. 2 is an enlarged detail showing the connectible belt extending around the pulley with the connector holding the opposite ends together.

FIG. 3 is a schematic view showing the manner in which the connector belt is connected by the present invention.

FIG. 4 is an enlarged detail view taken along line 4—4 of FIG. 3.

FIG. 5 is an enlarged perspective view of the connector of the present invention.

DETAILED DESCRIPTION OF THE PREFERRED EMBODIMENT

Figure 6:
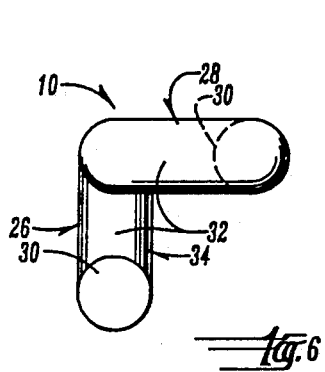
FIG. 6 is an end elevational view taken along line 6—6 of FIG. 5.
Figure 7:
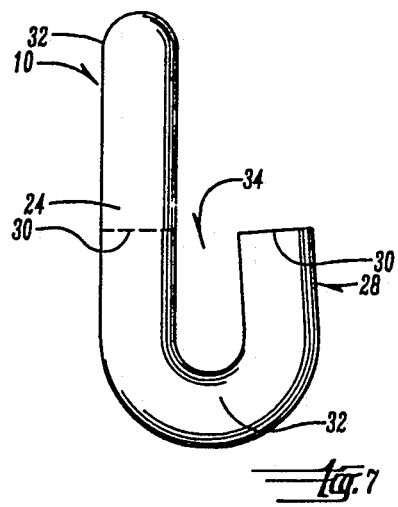
FIG. 7 is a top plan view taken along line 7—7 of FIG. 5.

Referring to the drawings, the numeral 10 generally designates the connector of the present invention. Connector 10 is shown in use with a continuous belt 12 which is trained around a pair of spaced apart pulleys 14. The pulleys each are connected to shafts 16.

Belt 12 is formed from an elongated member having loops 18,20 at its opposite ends. In the drawings the elongated member is shown to be formed form a twisted belt member 22 which is twisted to create the loops 18,20 at the ends thereof. While a twisted belt is shown in the drawings, it is also possible to provide the loops at the ends of the connectible belt by forming the loops, molding the loops, or welding the loops onto the ends of an elongated belt.

Referring to FIG. 5, connector 10 comprises an elongated central shank 24 having a first J-shaped hook 26 at one end and a second J-shaped hook 28 at the opposite end. Each hook is formed from a hook end portion 30 and a rounded portion 32. A hook slot 34 is formed between the hook end portions 30 and the shank portion 24. J-hook 26 lies in a plane which is different from the plane in which hook 28 lies. Preferably these two planes are perpendicular to one another, but it is also possible to orient the two J-hooks 26,28 either in the same plane or at angles other than perpendicular to one another without detracting from the invention.

Figure 8:
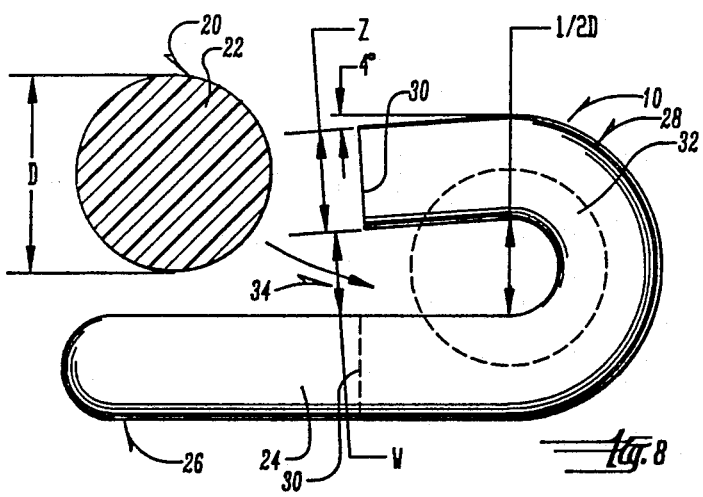
FIG. 8 is a view similar to FIG. 7, and illustrating the manner in which the loop member is fitted within the slot of the on the connector.
Figure 9:
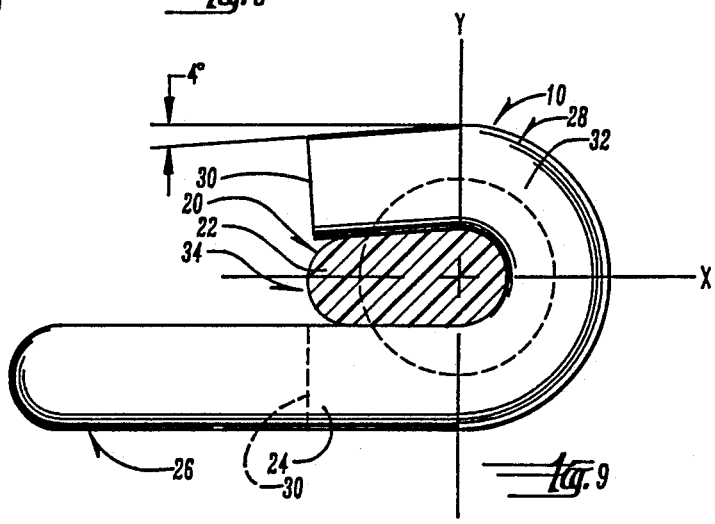
FIG. 9 is a view similar to FIG. 8, but showing the loop member fitted within the slot of the connector.

One important feature of the present invention is the relative widths of the slots 34 and the diameters of the belt members 22 of loops 18,20. As can be seen in FIG. 8 the diameter "D" of the loop member 22 is shown to be twice the width (½ D) of the slot 34 at its extreme inner end. Thus, when the hooks 28,30 are hooked over the loops 18,20 with the belt member 22 compressed within the slots 34, the cross sectional configuration of the belt member is as shown in FIG. 9. FIG. 9 illustrates that the cross sectional configuration of the belt member 22 is elongated with a major axis "X" which is longer than the minor axis "Y". Axis X extends in a direction approximately the same as the longitudinal axis of the elongated slot 34. In this configuration, the elliptical or elongated cross sectional configuration of belt member 22 prevents the belt member from rotating within the slots 34 of hooks 28,30. The resistance to rotation is caused by the friction of the belt member 22 within the slot 34, but it is also resisted by virtue of the elongated or elliptical shape of the belt within the slot 34.

The present invention is to be contrasted with prior devices which crimped the hooks of the connector after the hooks had been hooked over the loops of the belt. In the present invention the connectors are preformed so that the widths of the slots within the hooks are substantially less than the diameter of the belt member. Thus, it is not necessary to crimp the connector after assembly. All that is necessary is to force the hook over the loops of the belt so that the belt member is compressed as shown in FIG. 9. When it is desired to remove the device, the belt member can be slipped out of the slot 34 for disconnection.

Another feature of the present invention is the fact that the end portions 30 are angled slightly inwardly toward the shank portion 24, thereby creating a width "W" which is slightly less than the width ½ D at the inner end of slot 34. Furthermore, width W is less than the diameter Z of the connector itself. The slightly reduced width adjacent the mouth of slot 34 inhibits the movement of the belt member 22 out of the slot when there is slack in the belt. Furthermore, the fact that the width W is less than the diameter Z of the connector itself, permits a large number of connectors to be placed in a container while at the same time preventing them from hooking or tangling with each other. In manufacture, it is desirable to tumble a large group of the connectors so as to remove burrs or other sharp edges. This can be done with the present invention without the various connectors becoming tangled with one another.

When the belt is manufactured, one elastomeric loop of the belt is squeezed into one loop of the connector, leaving the other end to be assembled by the user of the belt. With the ends of the hooks in the connectors tilted in slightly, the connector will stay in place during handling and shipping and will not become lost. While the angle of tilting of the J-shaped end portion 30 may be varied, a preferred amount of tilting is approximately a 4° angle with respect to the shank 24.

The connector may be made of any rigid material, but the preferred material is a stainless steel wire of 0.065 inches in diameter. The elastomeric loops in the ends of the belt may be of varying diameters, but the preferred diameter is approximately ⅛" in diameter. The preferred width of the slot in combination with these above dimensions is approximately 1/16" in width.

Thus, it can be seen that the device accomplishes at least all of its stated objectives.

What is claimed is:

1. A belt connector for connecting first and second ends of an elongated belt, said first and second ends each comprising a loop formed from an elongated elastomeric loop member, said loop member having a hook engaging portion of predetermined cross sectional size; said connector comprising:

an elongated connected body having a fist J-shaped hook at one of its ends and a second J-shaped hook at the other of its ends; and said first and second J-shaped hooks each forming an elongated hook slot having an inner end, said hook slot having a longitudinal axis and having a width smaller than said predetermined cross sectional size of said hook engaging portions of said elastomeric loop members of said first and second loops whereby hooking each of said first and second hook members over side hook engaging portions of said first and second loop members respectively, causes said hook engaging portion of said loop member to be compressed by each of said first and second J-shaped hooks into a compressed portion, the cross sectional shape of said compressed portion being elongated and having a longitudinal axis extending in the same direction as said longitudinal axis of said hook slot.

2. In combination:

an elongated belt having first and second ends, each of said first and second ends comprising a loop formed from an elongated elastomeric loop member having a predetermined cross-sectional thickness;

an elongated connector body having a first J-shaped hook at one of its ends and a second J-shaped hook at the other of its ends, each of said J-shaped hooks comprising a hook end portion and a shank portion which are interconnected by a rounded portion and which are spaced apart from one another a distance which is less than said predetermined cross sectional thickness of said loop member;

said hook end portion and said shank portion defining an elongated hook slot having an open end adjacent said hook end, a closed end adjacent said rounded portion, and a longitudinal axis extending from said open end to said closed end;

said first and second J-shaped hooks being hooked through said first and second loops respectively, with said loop members of said loops each having a compressed portion extending through one of said hook slots of said first and second J-shaped members, said hook portion and said shank portion compressing said compressed portions of said loop members therebetween into cross sectional configurations which are elongated along a cross sectional axis extending generally in the same direction as said longitudinal axis of said slot so as to resist rotation of said compressed portions within said hook slots of said first and second J-hooks.

3. A belt connector according to claim 1 or 2 wherein said loop members are circular in cross section, said compressed portions of said loop members within said first and second hooks being approximately elliptical so as to resist rotation thereof within hook slots of said J-shaped hooks.

4. A belt connector according to claim 1 or 2 wherein said first and second J-shaped hooks each terminate in a hook end and each include a shank portion, said hook ends being spaced apart from said shank portions to create a mouth for said hook slot, the width of said mouth being smaller than the cross-sectional thickness of said body.

5. A belt connector according to claim 1 or 2 wherein each of said J-shaped hooks include hook end portions which terminate in a hook end, said hooks also each including a shank portion spaced from said hook end to form a mouth for said hook slot, the width of said hook slot adjacent said mouth being less than the width of the remainder of said hook slot.

6. A belt connector according to claim 5 wherein each of said hook end portions extend at an angle with respect to said shank portions.

7. A method of connecting the opposite first and second ends of an elongated belt, said first and second ends each comprising a loop formed from an elongated elastomeric loop member having a predetermined cross sectional thickness, said method comprising:

connecting each of said opposite ends of said belt to a connector body, said body having a first J-shaped hook and a second J-shaped hook for connecting to said loops of first and second ends respectively of said belt, said first and second J-shaped hooks each having a hook end portion and a shank portion spaced apart from one another to form an elongated hook slot therebetween, said hook slot having an open end and a closed end and a longitudinal axis therebetween, said hook slot having a width which is less than said predetermined cross sectional thickness of said loop member;

said connecting being accomplished by hooking each of said first and second J-shaped hooks over one of said loops, with said loop members of each of said loops extending through and being compressed within said hook slots between said hook end portion and said shank portion so that said loop members will be deformed between said hook end portions and said shank portions into an elongated cross sectional compressed portion having a long axis and a short axis, said long axis extending in the same general direction as said longitudinal axis of said slot whereby said elongated compressed portion engages said hook portion and said shank portion to resist rotational movement within said hook slot.

* * * * *